March 19, 1968     H. R. SMALLEY     3,373,991
MOBILE SWIMMING SUPPORT AND INSTRUCTION APPARATUS
Filed April 29, 1965     5 Sheets-Sheet 5
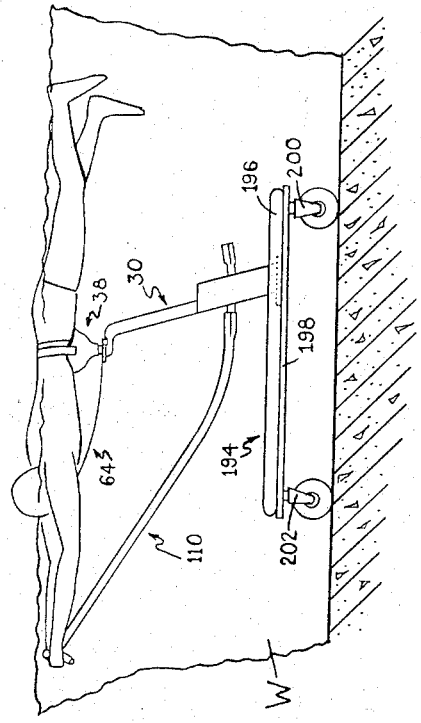
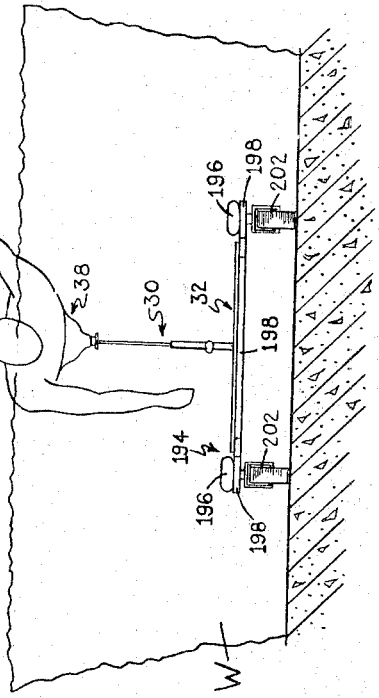
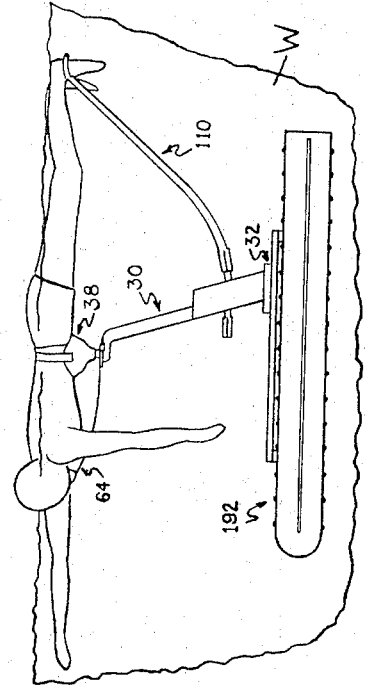
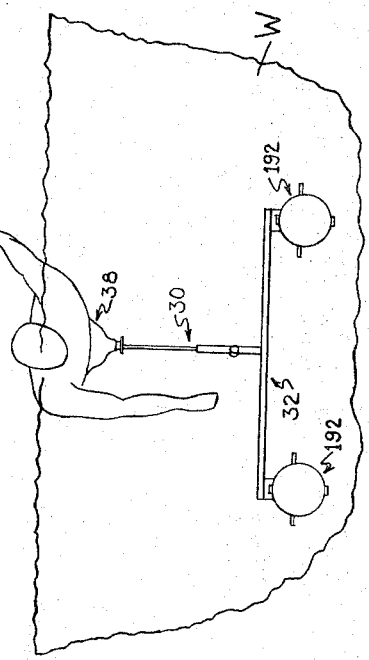

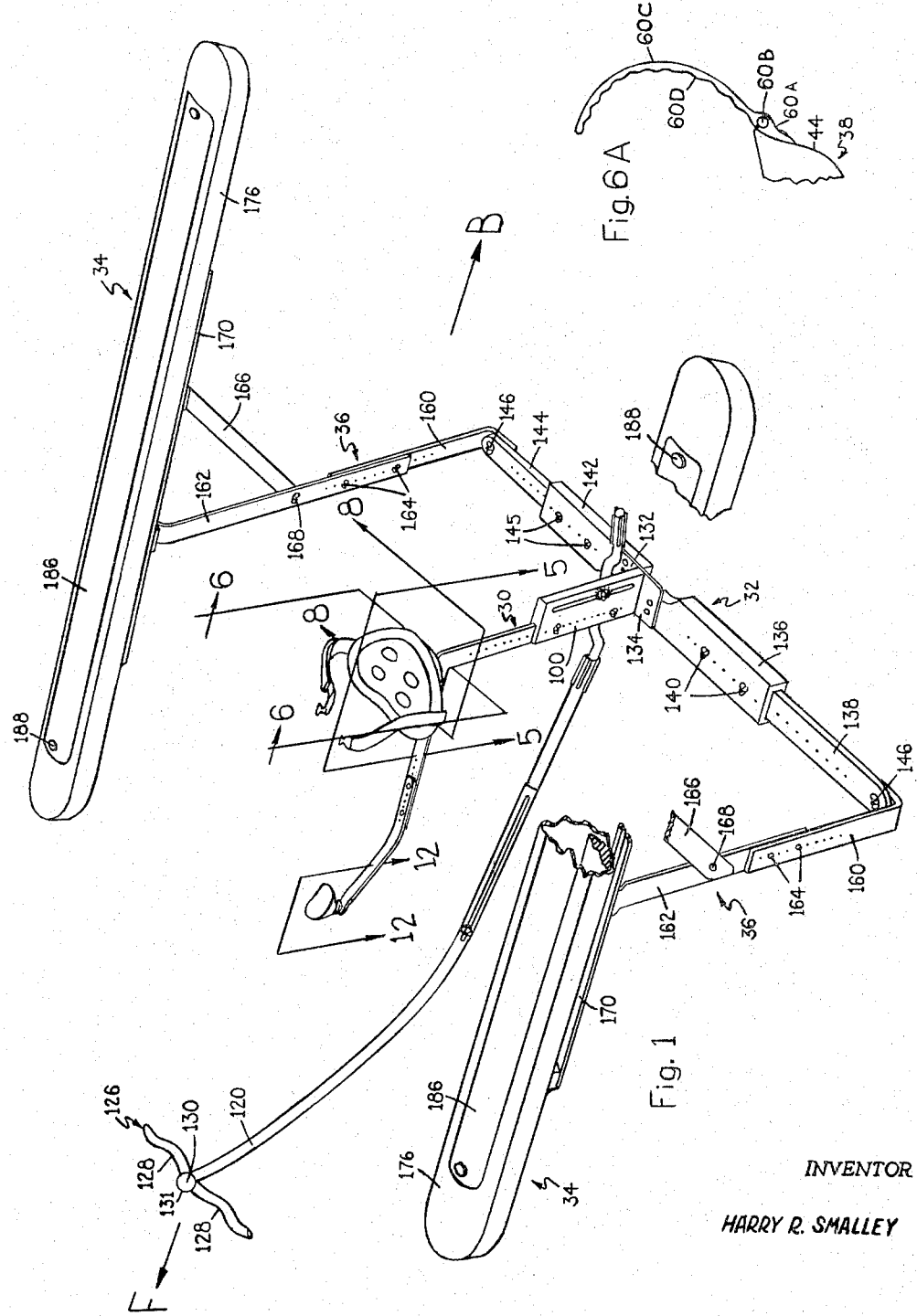

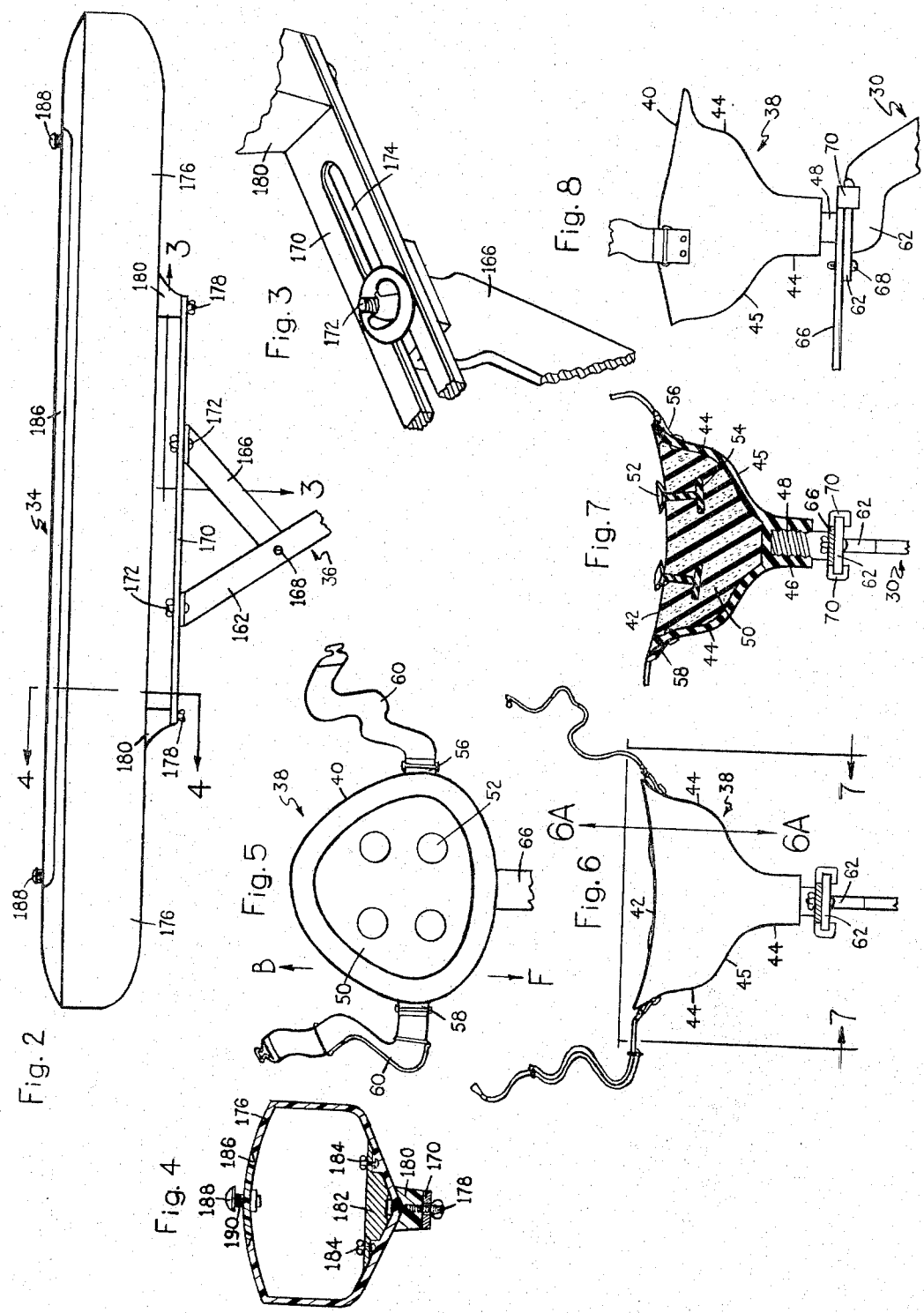

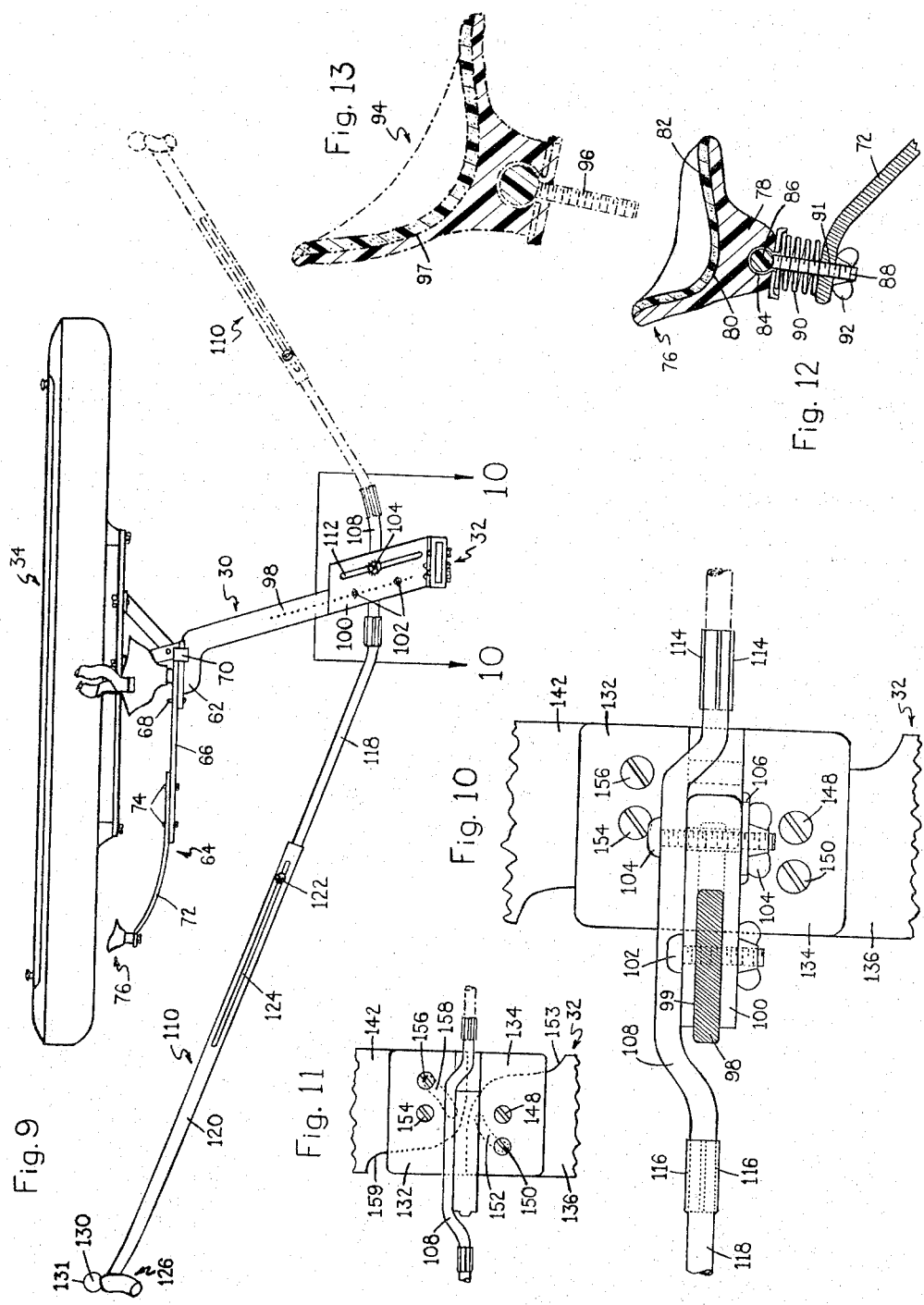

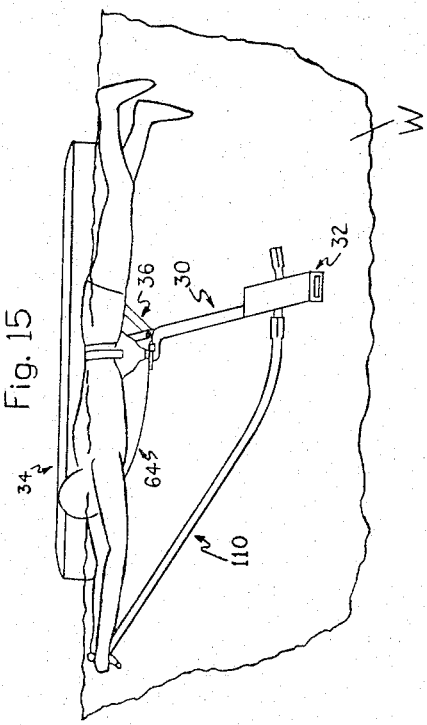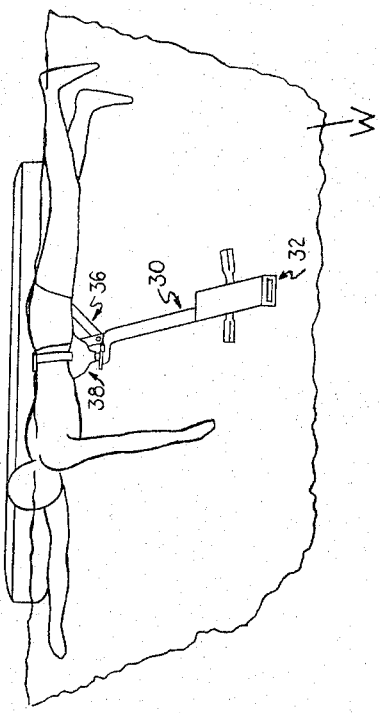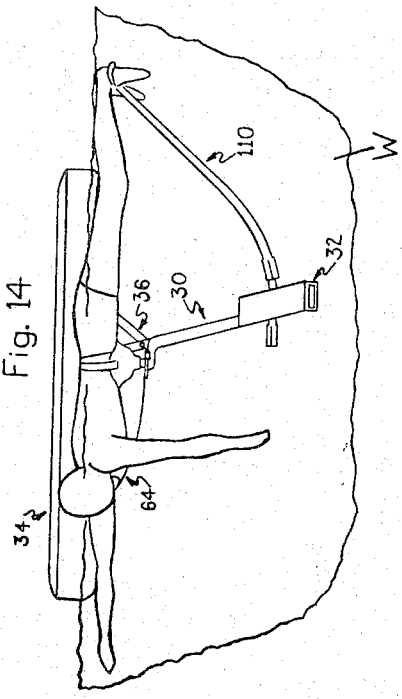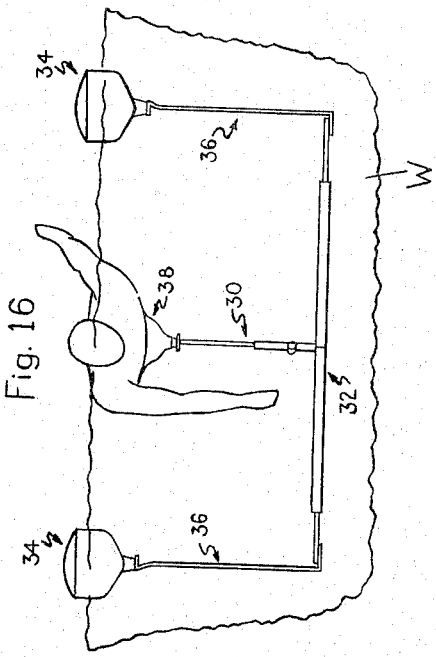

United States Patent Office 3,373,991
Patented Mar. 19, 1968

3,373,991
MOBILE SWIMMING SUPPORT AND INSTRUCTION APPARATUS
Harry R. Smalley, 1616 Mount Eagle Place, Alexandria, Va. 22302
Filed Apr. 29, 1965, Ser. No. 452,464
5 Claims. (Cl. 272—71)

ABSTRACT OF THE DISCLOSURE

A support apparatus for swimmers having a mobile base with adjustable and resilient torso support, an adjustable and resilient auxiliary head support attachment, and an auxiliary dual purpose attachment to support either the arms or legs of swimmers. The apparatus with auxiliary attachments provides the resilient support function, supporting swimmers partially submerged in water, while not impeding natural swimming movements of swimmers.

This invention relates to a natatory support apparatus primarily designed for use in teaching the crawl, backstroke, and breaststroke forms of swimming, but which can also be used in teaching other forms of surface swimming.

The primary object of the invention is to help the swimming pupil become at ease in water and assist said pupil to learn to swim with an easy, relaxed rhythm. It is, therefore, an object of the invention to provide a practical mobile device which flexibly supports a pupil, in a body of water, with a minimum amount of body contact to said apparatus so that a maximum amount of freedom for the pupil's head, torso, and limb members permits said pupil to propel himself with natural swimming stroke motions.

In accomplishing the above, another object of the invention is to incorporate into the apparatus a horizontally suspended transverse beam which serves as the mobile base of an upright column which has a resilient cradle cup support at its capital end, which in turn supports the pupil. These means provide the basis for making the apparatus function as described.

It is another object of the invention to provide the swimming instruction apparatus with special auxiliary support features that aid in training the pupil's legs, arms, and breathing technique in a rapid series whereby, as each skill is obtained, a certain auxiliary support feature of the apparatus is removed and the support lessened so that the pupil gradually loses dependency on said apparatus. The apparatus is merely a crutch which must eventually be removed. Therefore, in keeping with this loss of dependency, or weaning, from the apparatus, it is a further object of the invention that it should be used in conjunction with a conventional kick board so that the pupil's dependency will eventually be transferred from the apparatus to the kick board and then to nothing except the pupil's own ability to swim.

It is a further object of the invention to provide that the apparatus be entirely adjustable so that it will accommodate pupils of varying weights and heights.

It is still another object of the invention of said mobile apparatus to support the pupil, not buoyed unnaturally high in the water, so that the swimming instructor may observe normal and slow motion arm and leg motions and breathing technique in order to correct and/or eliminate errors in form thus noted. Thus, it is still another object of the invention to provide that the apparatus aid individuals who already know how to swim as well as non-swimmers.

In addition, another object of the invention is to provide that the apparatus be collapsible so that it may be transported and stored easily when not in use.

Important objects and features of the in invention heretofore not already mentioned will be apparent from the forthcoming description and accompanying drawings in which:

FIGURE 1 is a top perspective view of a mobile swimming support and instruction apparatus with a portion of the forward pontoon structure and its brace member cutaway to show detail embodied in the present invention.

FIGURE 2 is a side elevation, broken away and in section, showing one of the water surface pontoon structures with its brace connections.

FIGURE 3 is an enlarged, contracted, and fragmentary perspective view taken on the intersecting lines 3—3 of FIGURE 2.

FIGURE 4 is an enlarged vertical section taken on the line 4—4 of FIGURE 2.

FIGURE 5 is an enlarged sectional top view taken on the line 5—5 of FIGURE 1.

FIGURE 6 is an enlarged sectional front view taken on the line 6—6 of FIGURE 1.

FIGURE 6A is a fragmentary section taken on the line 6A—6A of FIGURE 6.

FIGURE 7 is a bisected sectional view taken on the line 7—7 of FIGURE 6 showing the cradle cup support of FIGURE 6 split vertically.

FIGURE 8 is an enlarged sectional side view taken on the line 8—8 of FIGURE 1.

FIGURE 9 is a fragmentary side elevation showing the present invention with the foremost water surface pontoon structure and its brace structure removed. In addition, it shows the auxiliary dual purpose support for the arms and legs in solid lines in the arm support position and in phantom lines in the leg support position. The auxiliary head support is also shown in position.

FIGURE 10 is an enlarged fragmentary sectional view taken on the line 10—10 of FIGURE 9.

FIGURE 11 is a contracted view of FIGURE 10 showing details underlain in the details shown in FIGURE 10.

FIGURE 12 is an enlarged, bisected, sectional view taken on the line 12—12 of FIGURE 1 showing the chin support section of the auxiliary head support of the present invention.

FIGURE 13 is a bisected view of an auxilary skull-base support section, drawn in phantom lines, which is used in conjunction with the auxiliary head support in a similar manner as the chin support section shown in FIGURE 12.

FIGURE 14 is a fragmentary schematic side elevation with the foremost surface floating pontoon structure and its brace structure removed to show a side view of a pupil supported by the mobile apparatus in a body of water. In addition, it shows the auxiliary chin support in position, and the auxiliary dual purpose arm and leg support in the leg support position.

FIGURE 15 is a view like FIGURE 14 showing a pupil supported in a body of water by the mobile apparatus with the auxiliary chin support in position and the auxiliary dual purpose arm and leg support in the arm support position.

FIGURE 16 is a schematic front elevation showing a pupil supported in a body of water by the mobile apparatus with all auxiliary supports removed.

FIGURE 17 is a view like FIGURES 14 and 15 showing a pupil supported in a body of water by the mobile apparatus with all auxiliary supports removed.

FIGURE 18 is a schematic side elevation showing a pupil supported in a body of water by an apparatus which owes its prime source of mobile support to two submersible pontoon like structures instead of the two surface floating pontoon structures of FIGURES 1, 2, 4, 9, 14, 15, 16, and 17.

FIGURE 19 is a schematic front elevation showing an apparatus like that of FIGURE 18 with two submersible pontoon like structures providing the prime source of mobile support.

FIGURE 20 is a schematic side elevation showing a pupil supported in a body of water by an apparatus which owes its prime source of mobile support to a non-buoyant mobile vehicle which is mounted on four wheels and remains in contact with the level floor surface of a body of water.

FIGURE 21 is a schematic front elevation showing a mobile apparatus like that of FIGURE 20 with the four wheel non-buoyant vehicle providing the prime source of mobile support.

Referring to the drawings, FIGURE 1 shows the natatory support and instruction apparatus, according to the presently preferred form, which has a general superstructure consisting of four basic parts: an upright supporting column, indicated generally by the reference numeral 30; a horizontally suspended transverse beam, indicated generally by numeral 32, which serves as the mobile base of supporting column 30; surface floating pontoon sections, generally indicated by numeral 34; and brace sections, indicated generally by numeral 36, which lie in a perpendicular plane and connect the surface floating pontoons sections 34 to the suspended transverse beam 32. The letter F designates the front of the apparatus and the letter B designates the back of said apparatus shown in FIGURE 1. Sections generally numbered 30, 32, and 36 may be made of metal while 34 may be made of plastic, metal or other suitable material.

At the capital end of supporting column 30 is a resilient cradle cup, indicated generally by 38, which is made of rubber or other material with similar properties of rubber; 38 directly supports the torso of the pupil, see FIGURES 1, 5, 6, 6A, 7 and 8. FIGURE 5 illustrating a top view of 38 shows that its periphery 40 is an imperfect ellipse with the distorted odd edge of the circumference facing B, the back of the apparatus. This general shape of the top view portion of 38 enables the pupil to gain support in a horizontal position on 38 (lower stomach portion of the torso for the crawl and breaststroke and the small of the back portion of the torso for the backstroke) without having said pupil's pelvic-thigh bone and muscle movements impeded when said pupil executes swimming movements in a body of water. In addition, the top portion of 38 (front view—FIGURE 6) has a concave shape 42 which further affords the pupil a contour fit for said pupil's lower torso when in the proper horizontal body position for swimming.

FIGURE 6 showing the front view of 38 also illustrates the general cup like shape of the resilient rubber wall 44. Both the front view of FIGURE 6 and side view of FIGURE 8 show that although the periphery 40 (of cradle cup 38) has a general shape of an imperfect ellipse, the lower and middle portion of cup like wall 44 is circular until it branches into the upper peripheral portion 40 of cradle cup 38. The cradle cup side wall 44 is designed so that it may bend under applied pressure and then recover to its original position or bend in the direction of other applied pressure returning to its original position and shape when all forceful pressure ceases. The bending or flexing feature of wall 44 is designed to occur at the sloping area marked 45 which is curved and is located completely around 38 at the indicated area 45; this is accomplished by constructing wall 44 of resilient rubber material means, of a predetermined thickness and curvature so that the critical area 45, of wall 44, may deflect under a predetermined amount of applied pressure in the direction of said applied pressure. Thus, it can be seen that the pupil's torso is directly supported by the resilient, contour fitting cradle cup support 38 which allows for the complete freedom of natural swimming motions of the pupil's body as reflected by torso movement made in conjunction with limb movements. Cradle cup 38 provides sturdy, yet flexible support for the torso portion of a pupil's body when said pupil is mounted on the apparatus in a body of water. It is understood that a body of water has a natural buoyant effect upon the body weight of a pupil and, thus, provides natural buoyant support.

At the base of 38 is a thread lined recess 46 which permits the cradle cup 38 to be united to 48, a threaded perpendicular cylindrical projection which is the upper most metal portion of supporting column 30; cradle cup 38 is thus threaded on to perpendicular cylindrical projection 48. By unthreading cradle cup 38, 38 may be disconnected from the remaining portions of the apparatus. The substitution of different size units of cradle cup 38 (such as small, medium, large, etc.) will insure different size pupils a good fit. It is evident that other means could be used for securing the cradle cup 38 to the capital end of supporting column 30. In the center of cradle cup 38 is a resilient foam rubber material 50 which is fastened to the inner edge of rubber wall 44 by suitable adhesive means and has a water proof coating at its upper end at 42, which comes in contact wtih the pupil's torso. Embedded in the foam rubber material 50 is a rubber suction cup structure 52 which has an upside down T stem structure 54 that anchors the suction cup 52 in the foam rubber material 50; suitable adhesive materials are used to unite 54 with 50. FIGURE 5 shows four such suction cups; more may be added. The function of suction cup 52 is to provide a gripping suction means so that the pupil's torso will not slip from cradle cup 38.

Attached to the upper portion of the wall 44 are suitable fastening means 56 and 58 which fixedly secures an adjustable belt means 60. However, in preference to the adjustable belt means 60 parts 60A, 60B, 60C, and 60D (which appear in FIGURE 6A) are substituted. Attached to the upper portion of the wall 44 is a spring hinge arrangement which is made up of a short hinge arm 60A (suitably attached to 44), a torsion spring 60B at the hinge pivot point, and a long arced rubber coated metal band hinge arm 60C. The inner surface 60D of the arced hinge arm 60C is corrugated like in shape and made of suitable rubber coating material which is slightly flexible permitting arced hinge 60C, with the aid of torsion spring 60B, to firmly grip the sides of the pupil's lower torso without causing discomfort to said pupil. Thus, the arced hinge arm 60C in conjunction with the torsion spring 60B, holds the pupil's torso in place on the cradle cup 38. This spring hinge arrangement illustrated in FIGURE 6A is located in fastening positions 56 and 58 of FIGURE 5 in substitution for belt means 60. Since the arrangement is spring action and does not entirely encircle the waist, the pupil may release himself from the apparatus and is not "strapped on" as would occur if belt means 60 were used.

Referring to FIGURE 7, the threaded cylindrical projection 48 is an integral portion (united by welding or other means) of the T-shaped frame 62 (48 is located on the top of T frame 62) which in turn is an integral portion of supporting column 30. The top or flat edged portion of T frame 62 acts as a base for attaching an auxiliary head support, designated generally by 64 to supporting column 30, see FIGURE 9. This auxiliary head support 64 is used to support either the chin (for the crawl and breaststroke) or the base of the skull (for the backstroke) and is removed from the main apparatus structure by detachment from 30 as the pupil's training progresses. (Note: With slight alteration, auxiliary support 64 may be adapted to provide support for the upper chest and/or upper back region of the pupil's body.) When attaching 64 to 30, bar member 66, with a cut out section 48, is slid along the top of T frame 62. A conventional bolt and wing nut unit 68 unite the auxiliary head support 64 to supporting column 30 by securing bar member 66 to T frame 62. Clamp like edges 70 (C shaped in appearance and an integral part of bar member 66)

form fit around the top edges of the T frame 62, further aiding in uniting 64 to 30. Bar member 66 is united to bar member 72 by conventional bolt and wing nut units 74. Overlapping bar member 72 and bar member 66 have a plurality of apertures so that bolt locking means by 74 may be made in several places, thus, expanding or contracting the overall length of head support 64.

At the far end of a bar member 72, facing in the direction of F, in FIGURE 1, is a chin support cup, generally indicated by 76. The top portion of chin support 76 is a die molded mass of Teflon plastic material 78 which has a contoured area that conforms to the shape of a pupil's chin at its upper end which is indicated as recess 80, into which the pupil's chin rests. A water proof, soft rubber coating material 82 is affixed to recess 80, by suitable adhesive means, to provide a soft cushion for the pupil's chin. At the lower end of 78 is a cavity 84 which serves as a socket for ball 86 which is an integral part of bolt 88. The ball 86 at the top of bolt 88 is made or is coated with Teflon; the material of which 78 is made. It can be seen that units 84 and 86 form a ball socket joint; being made of Teflon, no oil is necessary for lubrication nor can any corrosion occur. The chin support 76 may be fabricated so that bolt 88, with its integral ball top 86, form one unit being permanently united by the ball and socket joint. A rust proof spiral coil spring 90 is placed over the stem portion of bolt 88 and then bolt 88 is passed through a hole 91 in bar member 72, see FIGURE 12. Wing nut 92 is then threaded on to bolt 88 until sufficient tension is placed on coil spring 90. The tension in coil spring 90, together with the ball and socket joint formed by 86 and 84, provide the resilient aspects of flexible chin support 76.

By substituting different size units of 76 (such as small, medium, large, etc.) pupils of varying sizes may all be adequately fitted; thus, providing an adjustable means for this auxiliary portion of the apparatus.

Bar member 72 of auxiliary head support 64 is constructed to have the general properties of a leaf spring in order to produce an upward springing effect at the end of 72 where chin support 76 is affixed; this is accomplished in order to make head support 64 perpendicularly adjustable (perpendicular to the surface of the water) so that pupils of various sizes may use the apparatus without having any portion of 64 touch said pupils' bodies except recessed cushion 82. In addition, the stem length of bolt 88 and the length of coil spring 90 may be increased to further effect the perpendicular adjusting quality of auxiliary head support 64. It is understood that when the mobile support apparatus is in use, the pupil's head will require only a small amount of support from 64 since said pupil's body will already be supported by the natural buoyancy of the water and cradle cup 38.

The portions in the makeup and material of skull base support, generally indicated by 94, and bolt 96 (drawn in phantom lines in FIGURE 13) are generally the same as those mentioned for chin support 76. The exception is that the curved recess 97 (substituted in place of recess 80) is contoured to conform to the base or back portion of the pupil's skull instead of said pupil's chin. Like 76, skull base support 94 may come in different size units (small, medium, and large, etc.) making it an adjustable portion of auxiliary head support 64.

The general structure and resilient features of cradle cup 38 may be adapted as an alternative means for providing flexible support for the pupil's chin and skull. Such alternative chin and skull base supports could be made of rubber with the resilient features of 38, but with the upper contour shape of 76 and 94; manufacturing cost considerations of producing these auxiliary support might make the alternative chin and skull base supports, just mentioned, the preferred forms instead of the alternative forms.

As mentioned earlier, supporting column 30 is made up of the threaded cylindrical perpendicular projection 48 and T frame 62 which are integral parts of the capital end of 30. The shaft 98, the integral center portion of column 30, has a general rectangular shape of two flat, broad sides and two narrow edged sides. The broad edged sides of shaft 98 are in a parallel plane to that of pontoon sections 34. This is done in order to present a minimum surface area of obstruction to a pupil's hands and arms when said pupil is performing the arm motion stroke of the crawl. Also, for this same purpose of reducing arm obstruction, shaft 98 is angled forward in relation to suspended transverse beam 32, which serves as the mobile base for column 30. Cradle cup 38 will thus be located upward and forward of 32 which increases the distance between the arm pit area of the pupil's body and 32, thus, decreasing the possibility of said pupil's finger tips coming in contact with 32. Shaft 98 is affixed to the suspended tranverse mobile beam 32 by first being keyed into a hollow upright inclined slot 99 in the upright base member 100 of the horizontal mobile base 32, see FIGURES, 1, 9, and 10. Then, shaft 98 is secured in its key slot position 99 in upright base member 100 by conventional bolt and wingnut units 102. Upright base member 100, like shaft 98, is angled forward. Both 98 and 100 have a plurality of apertures which permit the length of column 30 to be expanded or contracted which directly effects the depth at which a pupil's torso is supported by the mobile apparatus in a body of water.

Shaft 98 and upright base member 100, however, may be constructed in a single, solid unit with the length of column 30 being made long enough to accommodate pupils with extreme arm length without causing any obstruction for the arms of said pupils. The mobile support apparatus has another feature which accomplishes the function of increasing or decreasing the depth at which a pupil's torso is supported in a body of water; the adjustable means will hereinafter be described.

A conventional bolt and wing nut unit 104 with a locking washer 106 provide means for affixing stock receiver 108 to upright base member 100. (In all previously mentioned and succeeding unions made by bolt and nut means, a lock type washer may be assumed to be part of the bolting unit mentioned.) The stock receiver 108 is a relatively short cylindrical bar like object which serves as a joiner or coupling unit for a dual purpose support, indicated generally by 110, for the pupil's arms and legs. This dual purpose support 110 is an auxiliary support portion of the apparatus which provides support means for both the arms and legs of the pupil at different time intervals. FIGURE 9 illustrates the support 110 in solid lines in the arm support position and in phantom lines in the leg support position. Support 110 is adjustable and it can be removed from the main portion of the apparatus.

Cut in the upright base member 100 is a narrow upright inclined slot 112 which permits stock receiver 108 to be affixed to 100 by 104 at various locations on 100 up and down slot 112. In addition, 108 may be affixed to 100 by bolt and nut unit 104 at different angles relative to one another, thereby, influencing the general slope and location of the dual arm-leg support 110. On the cylindrical edges of both ends of stock receiver 108 are rod like appendages 114 (four, or more if desired, on each end of 108) which act as key edges for receptacle slots 116. Receptacle slots 116 (similar in number and location to 114) form a socket arrangement and are located at the lower end of tube member 118 which is a portion of 110. The receptacle slots 116 are united to appendages 114 in a socket union, thus, affixing the auxiliary support 110 to upright base member 100, which is a part of the main apparatus. It is evident that other means could be used to adjustably secure auxiliary support 110 to the main portion of the apparatus.

Attached to the upper portion of tube member 118 is tube member 120 which is telescoped over tube member 118. Conventional bolt and wing nut unit 122 (122 is permanently located on tube member 118) locks tube member 120 in its relative position to tube member 118. Slot 124 found in tube member 120 provides the means for allowing 120 to slide past bolt and nut unit 122 (when 122 is loosened), thus, enabling the overall length of the dual purpose auxiliary support 110 to expand and contract in order to fit the needs of various size pupils. At the extreme opposite end of support 110 (opposite in relation to receptacle slots 116) is a handle bar arrangement, indicated generally by 126, which has smooth concave curves 128 that are designed to accommodate the ankle area of the pupil's legs as well as the pupil's hands. In addition, the general shape of handle bar 126 is designed so that the pupil can easily remove his legs from the support 110 as well as his hands, both outer edges of 126 are curved downward. The entire handle bar 126 has a soft rubber coating material which is affixed to 126 by suitable adhesive means. Bolt and wing nut unit 130 provides a means of securing the handle bar 126 to the upper end of tube member 120, in a perpendicular position relative to 120. The top portion of the bolt, of bolt and nut unit 130, consists of a large knob 131. When the pupil begins to co-ordinate the arm stroke of the crawl with the kick, said pupil may have the handle bar 126 adjusted to be turned in the same direction, parallel, to tube member 120 and hold on to knob 131 with one hand while practicing the arm stroke with the other. Other means could be used to accomplish this same result.

Referring to FIGURE 1, bracket plate 132 is located on the lower right side of upright base member 100. Bracket plate 132 is an integral portion, united by welding or other means, of 100 and serves the general purpose of providing a surface to affix supporting column 30 to the suspended transverse beam 32, which lies in a horizontal plane and serves as the mobile base for 30. On the lower left hand side of upright base member 100 is bracket plate 134 which serves the same purpose as does bracket plate 132 and is united to 100 by similar means. Affixed to bracket plate 134 is beam member 136 by means which will be hereinafter described. Beam member 136 has a hollow center (up to that portion which is outwardly engaged with bracket plate 134) which is designed so that beam member 138 may be telescoped within the hollow recess of beam member 136. Both beam members 136 and 138 have a plurality of apertures so that bolt locking means, by conventional bolt and wing nut units 140, may be made in several places, thus, expanding or contracting the length of suspended transverse beam 32. Beam member 142, similar in construction to beam member 136, is affixed to bracket plate 132 by means which will be hereinafter described. Beam member 144, similar in construction to beam member 138, is telescoped into the hollow recess of beam member 142 just as 138 is into 136. Both beam members 142 and 144 have a plurality of apertures so that bolt locking means, by conventional bolt and wing nut units 145, may be made in several places, thus, expanding or contracting the length of 32. Thus, it can be seen that the overall length of 32 may be adjusted.

Conventional bolt and wing nut units 146 secure beam members 138 and 144 to brace sections 36 which in turn are connected to the surface floating pontoon sections 34. When a tall pupil is learning the breaststroke movements, it is necessary that the surface floating pontoon sections 34 be placed far enough apart to accommodate the pupil's long arms since the arm movement of the breaststroke requires that the arms (at one point in the stroke) be at right angles to the torso portion of said pupil's body. By adjusting the overall length of 32, the apparatus may accommodate said long armed pupils learning the breaststroke.

Returning now to the means of affixing support column 30 to suspended mobile base 32, bracket plate 134 is secured to beam member 136 by conventional bolt and wing nut unit 148 and unit 150. (It is desirable that the apparatus be collapsible for the convenience of transporting, handling, and storing said apparatus when it is not in use.) Thus, when 148 and 150 are loosened, bolt and wing nut unit 148 serves as a pivot point (in addition to uniting 134 to 136 when tightened) while bolt and wing nut unit 150 (also uniting 134 to 136 when tightened) moves within arced slot 152 (arced slot 152 is cut in beam member 136) when beam member 136 is turned counterclockwise. Bolt units 146 are also loosened in the collapsing operation. Beam member 136 has a curved edge 153 which allows 136 to swing free of beam member 142.

Bracket plate 132 is secured to beam member 142 by conventional bolt and wing nut unit 154 and 156. Bolt and wing nut unit 154 fulfills a similar function as does 148 and 156 fulfills the similar function of 150. Similarly, arced slot 158 (arced slot 158 is cut in beam member 142) provides a path for bolt and wing nut unit 156 just the same as 152 does for 150. Beam member 142 has a curved edge 159, similar to 153, which allows 142 to swing free of beam member 136. Beam member 142 is also turned counterclockwise in the collapsing operation. It is evident that other means may be used to accomplish this collapsing operation.

Brace member 160, of brace section 36, which is bent at its lower end, is secured to suspended mobile base 32 by conventional bolt and wing nut units 146 and is affixed to brace member 162 by conventional bolt and wing nut units 164. Both brace members 160 and 162 have a plurality of apertures so that bolt locking means, by 164, may be made in several locations, thus, expanding or contracting the overall length of brace section 36. Multicolored calibration markings are made on 160 and 162 in order to make similar adjustments on both brace sections 36 (located at opposite ends of 32) easy for the instructor to accomplish on the apparatus while in a body of water.

The adjustments made to expand or contract the overall length of brace sections 36 will have the direct effect of increasing or decreasing the depth at which the pupil's torso is supported in a body of water since adjusting brace sections 36 has the direct effect of altering the depth at which cradle cup 38 is maintained in a body of water; this is the adjustable means which was mentioned earlier as an alternative for having shaft 98 and upright base member 100 adjustable separate units.

Brace member 166 is affixed to brace member 162 by conventional bolt and wing nut unit 168, see FIGURES 1 and 2. Brace member 166, of brace section 36, serves as a swaybrace to strengthen the union of 32 to 34 which is made by 36. Both brace members 162 and 166 are bent, at their upper ends, in such a manner as to permit them to be united with girder 170, of pontoon section 34, by conventional bolt and wing nut units 172, see FIGURES 2 and 3. It is evident that other means could be used to affix brace section 36 to pontoon section 34.

The bent surfaces of brace members 160, 162, and 166 of one side of 32 are just the opposite for the similar brace sections connected on the opposite side of 32. The narrow slot 174, found in the center length of girder 170, provides a means for permitting brace section 36 to be moved and locked, by 172, at different locations along the length of girder 170 for a purpose that will be hereinafter described.

The girder 170 is attached to pontoon 176 (which is shaped on the order of a ship's hull) by bolt and wing nut units 178 with blocks 180 inserted between 170 and 176. The attachment of 170, 180, and 176 is permanent and, thus, can be made by other means than bolt and wing nut units 178. (Note: all such unions of 170, 180, and 176 must be waterproof.) The pontoon structures 176 serve as surface floating pontoons which, by way of connections made with brace sections 34, hold 32 in a suspended state. Thus, it is evident that since 32 is the mobile base of upright supporting column post 30, said supporting column 30 (with the resilient cradle cup 38 secured to its capital end) is a suspended, mobile, upright column support. Ballast 182 lies within the hollow center portion of 176 at its inner bottom, see FIGURE 4. Ballast 182 is secured in position by bolt and wing nut units 184 which are located at various points along the inner bottom length of 176.

In order to have the apparatus function correctly in its role as a mobile support for a pupil who is either learning to swim or correcting swimming form, said apparatus must provide stable (stable in reference to equilibrium stability) support while being mobile at the same time. To accomplish this, the pontoon structures 34 must be constructed to have longitudinal stability as well as lateral stability and at the same time produce as little drag as possible; the greater the drag on pontoon section 34, the more difficult it would be for a pupil to propel himself, while mounted on said apparatus, thru a body of water.

In addition to havnig equilibrium stability to stave off the effects of water in motion, i.e. the bobbing effect water in motion has on a floating object, the apparatus must have equilibrium stability to minimize the effects of torque which is created by the propelling motions of the pupil and transmitted to the apparatus. The resilient means of cradle cup 38 will reduce much of the torque created by the pupil's propelling motions.

To give the apparatus the desired longitudinal and lateral stability the amount and position of ballast 182 may be adjusted along the inner bottom length of 176, and the combined weight of sections 36, 32, and 30 may be adjusted in position along the length of girder 170. (Note: sections 36, 32, and 30 also serve as ballast for both of pontoon sections 34 in addition to 182.) The adjustments altering the relative locations of 182, 36, 32, and 30 in relation to sections 34 will determined by the amount and location of buoyant support afforded the pupil using the apparatus, the location of auxiliary supports, the general dimensions of the floating pontoons (i.e. the relative length, the width, the relative cross sectional structure—whether it be the preferred hull shape, or diamond shape, U-shape, rectangular shape, etc.) the distance the pontoons are apart, and the number of pontoons (whether it be the preferred two or possibly 4 etc.) since all the above will have an effect on the equilibrium stability of the apparatus when in use. When these factors are taken into account and the necessary adjustments in the locations of 182, 36, 30, and 32 relative to sections 34 are made, the apparatus will be able to function correctly. (Note: in the case of ballast 182, the amount and type of ballast in addition to location are necessary determining factors in the equilibrium stability of the apparatus.)

As an alternative to making ballast adjustments to insure equilibrium stability, the apparatus may be permanently stabilized by predetermining the overall ballast requirements to handle a maximum size pupil who might make use of the apparatus, i.e. the apparatus is stabilized to handle a maximum capacity load.

The art of stabilizing mobile floating objects is not new; much has been written on the subject. Briefly stated, the stability of a floating object depends upon a variety of factors: the position of the center of gravity, the position of the meta center in relation to the center of gravity, the general dimensions of the object, the freeboard and beam etc.—all these factors taken collectively determine stability. Since it is not an object of this invention to claim the origination of the above principles but instead only the use of said principles in relation to unique features embodied in, and within, the scope of the invention, further comment pertaining to the stability of floating objects will be deleted.

Lid cover 186 is secured in its position with the upper outer surface of 176 by L shaped clamp units 188. Spiral coil spring 190 is located in the top portion of 188; by pressing 188 down and twisting it in a 90 degree turn i.e. both units of 188 at the ends of 186), 186 will become disconnected to 176. Other means may be used to disunite and unite 186 to 176. The purpose for having an opening in the upper portion of 176 is so that ballast 182 may be added or removed along the inner bottom length of 176.

In addition to functions already mentioned, 32 (specifically beam members 136 and 142) serves as a step means for the pupil's feet and 64 (specifically bar members 66 and 72) serves as a hand rail means while said pupil is mounting or dismounting the apparatus in a body of water.

Since it is not a function of said natatory instruction apparatus to be used indefinitely by the pupil, a systematic teaching and then weaning program is incorporated into the use of said apparatus. A general program (neither confining nor stated in definite rank order) for teaching and then weaning the pupil is as follows: A training schedule for the crawl stroke. After the pupil becomes relaxed and at ease in the water, proper adjustments are made and the pupil is mounted on the apparatus. Once the pupil is supported by the apparatus, the legs are trained while the arms and head are supported. Next, the head and legs are supported while the arms are trained. Following this, support 110 is put in position for arm support and then 126 is adjusted to be parallel to 120; the pupil then co-ordinates the leg kick with one arm going through the arm stroke motion while the hand of the other arm holds onto 131. Then, support 110 is removed and the pupil co-ordinates, freely, the arm and leg movements. After this, the arm stroke is co-ordinated with the breathing procedure with only the torso being supported. Next, the pupil combines breathing procedure with the arm stroke and leg kick while only the torso is supported. Following this, the pupil is given a conventional kick board and is encouraged to: hold onto said kick board, push it away, and then swim up to it—then, repeat the procedure. (The purpose of this step is to physically and psychologically transfer dependency from the apparatus to the kick board.) Next, repeating the above step, a material means with a smaller periphery than 40 is placed between the pupil's torso and 38, thus, lessening torso support. Following this, the apparatus is removed from the pupil while said pupil is practicing (as described above) with the kick board.

FIGURES 14, 15, 16, and 17 illustrate the pupil being supported by the mobile apparatus in various stages of training. The letter W designates a body of water.

Once the pupil masters the crawl stroke, the breaststroke and backstroke may be taught with the use of the apparatus. Similar training schedules to that of the crawl (not necessarily with the kick board) may be set up for breaststroke and backstroke swimming instruction. (Note: auxiliary support 64 would not be used in the instruction of the breaststroke as it would present an obstruction to the arm movements of the pupil.)

In the preferred form of the apparatus, sections 34 provide the prime source of mobile support. FIGURES 18 and 19 illustrate an alternative mobile means for providing the prime support. Submersible pontoon-like structures, indicated generally by 192, replace sections 34. These submersible pontoon like structures 192 are constructed on the same well known principles as are submarines, and are affixed to the apparatus by being secured to 32. The method of 192 providing a mobile means of prime support for the apparatus involves the physical principle of neutral buoyancy. In order to function correctly, said submersible structures 192 must be capable of supporting the remaining portions of the apparatus and the pupil while maintaining a stable state of neutral buoyancy. Thus, it requires that no roll or pitch movement be transmitted from or to 192 to unstabilize its state of equilibrium in neutral buoyancy while permitting forward motion at a predetermined, constant depth. One broad submersible structure like 192 may be substituted in place of the two units of 192. If such were the case, stabilizer fins may be included with the single submarine like structure 192. The cost involved in utilizing 192 as the prime source of mobile support make 192 a secondary choice to the preferred form previously described.

FIGURES 20 and 21 illustrate another alternative mobile means for providing prime support for the apparatus. Instead of the apparatus being supported by any type of buoyant means, a non-buoyant mobile vehicle means, generally indicated by 194, is used to provide mobile support for the pupil on the apparatus. monorail and remain mobilely engaged with said monorail. Generally speaking, 194 is a weighted down vehicle made mobile by being mounted on wheels. The dead weight means 196 is affixed to frame 198. Back wheels 200 are set or locked in position while front wheels 202 may pivot; both 200 and 202 are affixed to frame 198. Section 32 is then united with frame 198. As a simple alternative, the frame 198 may be triangular in shape and be suspended on two back wheels 200 and one front pivotable wheel 202 or two pivotable front wheels 202 and one back wheel 200. At present, there are practically no bodies of water which have flat, firm bottoms; even pools do not, as their bottoms are sloped to facilitate drainage. This fact makes 194 a secondary choice to the preferred form, previously described, for providing a prime source of mobile support for the apparatus, unless flat bottom pools etc. become abundant.

An inexpensive substitute for a full size flat bottomed swimming pool would be a flat bottomed moat arrangement with a monorail located, lengthwise, at said moat's base. For such an alternative to 194, a contracted version of mobile base 32 would be affixed to a mobile wheeled base which would be positioned, straddlewise, over the monorail and remain mobilely engaged with said monorail. This would be another variation of the mobile non-buoyant support 194 shown in FIGURES 20 and 21.

In all instances mentioned of providing alternative means for supplying the prime source of mobile support for the apparatus, supporting column 30, with the resilient cradle cup 38 secured to its capital end, still functions as a mobile upright column post support.

It is perceived that the disclosed invention is not confined hereto and that minor variations and arrangements may be considered within the scope of the invention.

I claim:
1. A support apparatus used in the instruction and learning processes of swimming, comprising:
    means for supporting the user's body in such a manner as to permit the user the unimpeded freedom to execute any prescribed swimming forms including the crawl, breaststroke and backstroke swimming movements while said supported user is in a prone position in a body of water;
    said means having base means with a vertically adjustable, upright column post extending therefrom with resilient cradle cup support means attached to the uppermost end of the column post;
    said cradle cup means providing a contour fit for the lower portion of the user's torso;
    means to attach the user's torso to said cradle cup support means;
    said cradle cup support means being of sufficient rigidity to support a user in a prone position when partially submerged in water but of sufficient elasticity to bend under applied pressure in the direction of any of the compound angles associated with normal torso pitch and roll swimming movements while the user's torso is attached to said cradle cup means, and then, in the absence of said applied pressure, being of sufficient resiliency to recover, returning to its original position and shape.
2. The support apparatus of claim 1, wherein said means to attach the user's torso to said cradle cup support means comprises:
    hinge means ot permit the user to release himself from the torso point of contact with the support apparatus without the assistance of another individual.
3. The structure of claim 1 including suction means to assist the hinge means in flexibly attaching the user's torso to said cradle cup support means.
4. The support apparatus of claim 1 including auxiliary support means adjustable and attachable on either the front or back of said column post and base means providing support means for the user's arms and legs while, in either case, not impeding the remaining portions of said user's body to perform swimming movements while said user is supported by the apparatus in a body of water.
5. The apparatus of claim 1 including auxiliary support means adjustable and attachable on the front portion of said column post and base means providing resilient support means for flexibly supporting the user's head when said user is partially submerged in water while not impeding the remaining portions of said user's body to perform normal swimming movements.

References Cited
UNITED STATES PATENTS

| | | | |
|---|---|---|---|
| 1,966,448 | 7/1934 | Kobisius | 272—71 |
| 2,109,775 | 3/1938 | Hudson | 35—29.2 |
| 3,092,858 | 6/1963 | Wallach | 272—71 |

FOREIGN PATENTS

| | | |
|---|---|---|
| 340,724 | 10/1959 | Belgium. |
| 900,906 | 10/1945 | France. |
| 1,050,963 | 9/1954 | France. |
| 1,290,991 | 3/1962 | France. |

RICHARD C. PINKHAM, *Primary Examiner.*